United States Patent [19]

Mayer

[11] 4,251,866

[45] Feb. 17, 1981

[54] CONTROL UNIT HAVING A MEMORY IN WHICH A PROGRAM CONSISTING OF COMMAND WORDS IS STORED

[75] Inventor: Wolfgang Mayer, Munich, Fed. Rep. of Germany

[73] Assignee: Siemens Aktiengesellschaft, Berlin & Munich, Fed. Rep. of Germany

[21] Appl. No.: 5,825

[22] Filed: Jan. 23, 1979

[30] Foreign Application Priority Data

Feb. 13, 1978 [DE] Fed. Rep. of Germany ....... 2805939

[51] Int. Cl.³ .............................................. G06F 9/06
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,020,471 | 4/1977 | Woods et al. | 364/200 |
| 4,131,835 | 12/1978 | Lange | 318/562 |

OTHER PUBLICATIONS

Elektronik, 1975, vol. 1, pp. 53–57.

*Primary Examiner*—Raulfe B. Zache
*Attorney, Agent, or Firm*—Hill, Van Santen, Steadman, Chiara & Simpson

[57] ABSTRACT

A control unit contains a memory in which a program having command words is stored, a condition multiplexer with which it is determined whether a condition indicated in a command word exists, and an address unit in which the actual address of the command word to be targeted in the memory resides. For executing interruptions in the program sequencing at any given moment, a further multiplexer, a further address unit and at least one address register are provided. Upon occurrence of an interrupt request, the actual address is brought into the address register and the address of the next command word to be processed is supplied to the address unit by way of the further multiplexer. After termination of the processing of the interrupt request, the content of the address register is again applied to the address unit by means of the further multiplexer. The through-connecting of the further multiplexer is controlled by the further address unit.

6 Claims, 1 Drawing Figure

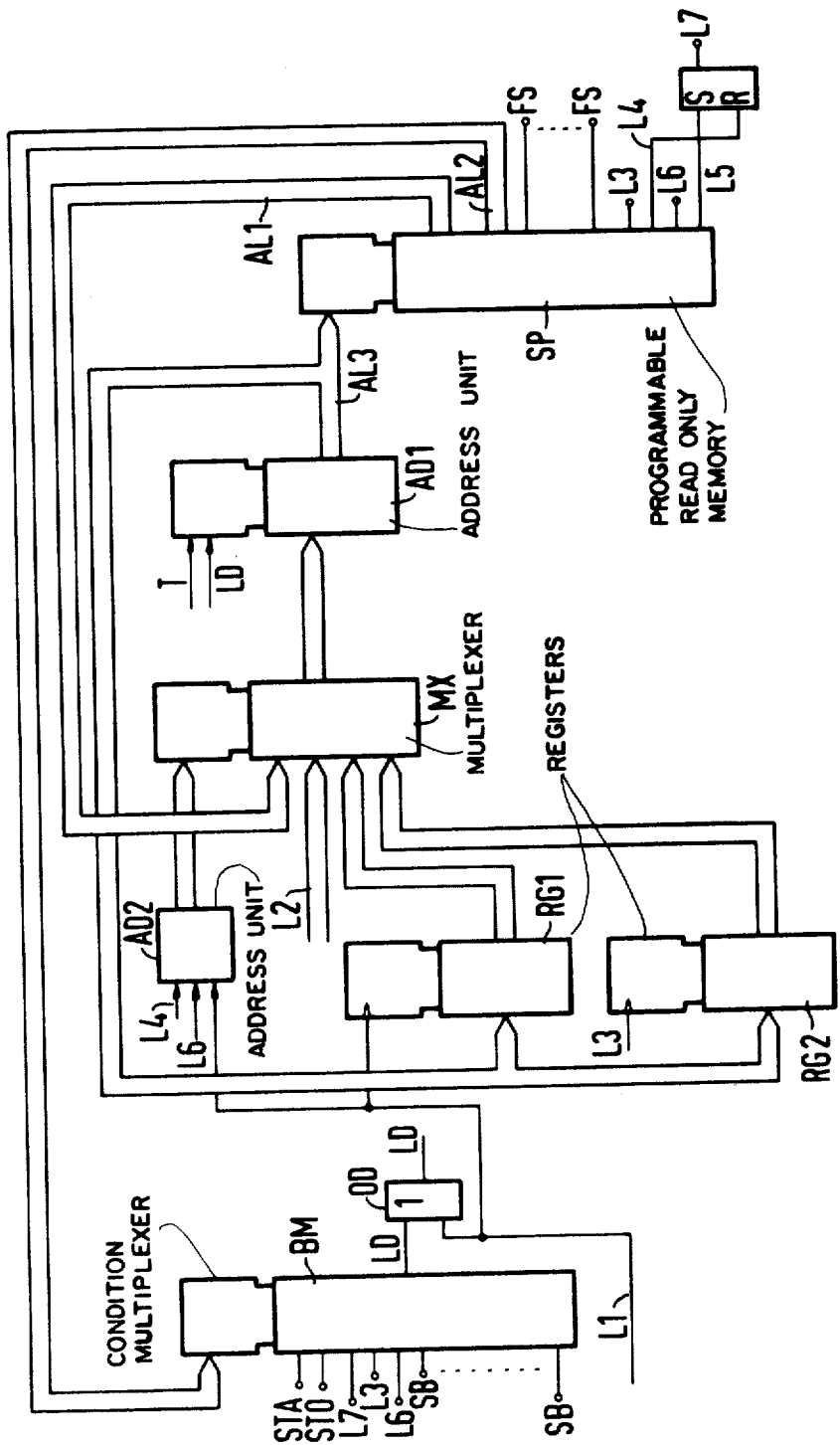

CONTROL UNIT HAVING A MEMORY IN WHICH A PROGRAM CONSISTING OF COMMAND WORDS IS STORED

BACKGROUND OF THE INVENTION

1. Field of the Invention

The present invention relates to a control unit having a memory in which a program consisting of command words is stored, corresponding to which either function signals are delivered, or, depending on the presence of a condition, a transfer to another command word present in the memory is undertaken. A condition multiplexer is addressed by the memory and receives condition signals and emits a load signal upon the presence of a condition indicated in the command word. An addressing unit is provided in which the actual addresses of the command word to be targeted in the memory resides and into which the transfer address of the next command word to be carried out is emitted from the memory upon the application of a load signal from the condition multiplexer.

2. Description of the Prior Art

Recently, microprogrammable control units, for example for peripheral devices, have been increasingly applied for the realization of complex control tasks. These control units offer a high flexibility in modification and expansion of their functions, since the essential portion of the control properties is realized by means of a microprogram and modifications can be achieved by the substitution of the microprogram. A disadvantage of microprogrammable control units is that operations, in contrast to pure hardware controls, can only run in temporal succession. This leads to significant limitations in the use of microprograms in very rapid control units.

At the present time, primarily microprocessors in MOS technology are being used for the realization of these microprogrammable control units. Conditioned by this technology and by the broadly fanned, command block provided for the wide area of application, command times of at least a number of microseconds result. In comparison thereto, bipolar microprocessors have significantly shorter command times, but require significantly more mounting space and power.

It appears, moreover, that of the multitude of the commands of the microprocessor in control units for peripheral devices, usually only a small number of commands is required. These commands have the following two functions: interrogation of changeable states of the system to be controlled (conditions), modification (control) of the states of the system to be influenced, for example, on the basis of the interrogated conditions. By waiving the commands which are not required, a considerable simplification of the logical structure of the microprocessor results and, therefore, also a decrease of the required command times. The control unit then resulting can be built with TTL modules and programmable read-only memories (PROM). With such a control unit, command and cycle times of under 100 nanoseconds are achieved.

Such a control unit is known from the publication "ELEKTRONIK" 1975, Vol. 1, Pages 53-57, which is fully incorporated herein for its teaching of this structure and environment. The control unit comprises a memory (PROM), a condition multiplexer and a status counter (address unit). The status counter contains the respective actual address of the command word contained in the memory which is to be executed. A clock pulse is applied to the status counter, which always advances the counter by a unit when a command has been executed. Furthermore, however, the status counter can also be loaded with an address. The programs with the command words are contained in the memory. The memory has outputs for emitting function signals, by means of which the control signals, for example, in a peripheral device, is triggered. It also has further outputs for emitting addresses for the condition multiplexer, on the one hand, and for the status counter, on the other hand. In particular, when in the sequence of the program a command word occurs according to which a condition is to be interrogated, then the condition multiplexer is addressed, to which the individual conditions are supplied as condition signals. The condition multiplexer determines whether or not the condition is fulfilled. If, for example, the condition is fulfilled, it causes the status counter to emit the address for the next command to be executed out of the memory. The emission of the transfer address from the memory is carried out upon the application of the next clock pulse.

A further embodiment of such a control unit may be derived from the German Offenlegungsschrift No. 622,964, also incorporated herein by this reference. This control unit likewise contains a memory, a condition multiplexer and an address unit. A format of the control unit is illustrated according to which, upon the presence of specific commands, desired functions can be executed.

The known control units, however, have the disadvantage that a sequence of a program cannot be interrupted from the outside and that a call-in of a subprogram by means of a command is not possible.

SUMMARY OF THE INVENTION

The object of the present invention, therefore, is to provide a control unit in which a program which is sequencing can be interrupted at any desired place.

This object is achieved in that, for executing interruptions in a currently sequencing program, a further multiplexer is provided which is connected with one input to the output for the transfer addresses of the memory and whose output is connected to the addressing unit, in that a further addressing unit is provided whose output is connected with the further multiplexer and delievers the addresses for conducting the various inputs of the further multiplexer to the address unit, and in that at least one address register is provided whose input is connected with the output of the addressing unit and whose output is connected with an input of a further multiplexer and to which an emission signal for accepting the actual address in the addressing unit is supplied when an interruption of the sequencing program occurs.

For executing interrupt requests, which are applied to the control unit from the outside, a further input of the further multiplexer is connected with lines to which the address of the next command word to be processed is applied. Further, a line for an interrupt signal is provided by means of which the time of the interruption and of the sequencing program is determined. This line is connected with the further addressing unit, with the input for the emission signal at the address register and with the input for the load signal at the addressing unit. As a function of the interrupt signal, the actual address in the addressing unit is output into the address register. Simultaneously, the further addressing unit effects that the further multiplexer connects the interrupt address through to the addressing unit. Thereby, the interrupt address can be loaded into the addressing unit and the corresponding command word can be targeted in the memory.

A flip-flop is expediently connected to the memory, which flip-flop is set when the program sequence is interrupted and reset when, after the end of the processing of the interruption, the content of the address register is transmitted into the addressing unit. The output of the flip-flop is connected with the input of the condition multiplexer. When the flip-flop is reset, then the condition multiplexer is caused to emit a load signal for the addressing unit. Simultaneously, a signal is delivered from the memory to the further addressing unit, by means of which the addressing unit is caused to connect the address register through to the addressing unit. Therefore, the address of that command word is reloaded into the addressing unit which was to be processed at the interruption of the program.

It is advantageous to provide a second address register whose input is connected with the output of the addressing unit and whose output is connected with the further multiplexer. A further input of the address register can be connected with an output of a memory at which an output signal is emitted when an interrupt is internally desired in the program sequence, when, for example, the transfer to a subprogram is to be executed. With this output signal, the actual address which resides in the addressing unit is then likewise loaded into the second address register. After completion of the internal interruption, the further multiplexer is again caused by the further addressing unit to again load the content of the second address register into the addressing unit.

The addressing unit can be constructed as a status counter which has an input for a clock pulse and an input for a load signal. When no load signal is applied to the status counter, its content is advanced by a unit upon application of a clock pulse. If, to the contrary, a load signal is applied, then, upon the occurrence of the next clock pulse, the address received from the further multiplexer is transferred into the counter.

BRIEF DESCRIPTION OF THE DRAWING

Other objects, features, and advantages of the invention, its organization, construction and operation will be best understood from the following detailed description, taken in conjunction with the accompanying drawing, on which there is a single FIGURE which is a schematic block diagram illustration of the format of a control unit embodying the present invention and with which interruptions can be carried out. The control unit, as will be evident from the description below, may be embodied exclusively from modules which are commonly known in the art.

DESCRIPTION OF THE PREFERRED EMBODIMENTS

Referring now to the drawing, a memory SP is provided which can be designed as a programmable read-only memory (PROM). The programs having the command words which are required for the execution of the desired functions with the control unit reside in the memory. The memory SP, therefore, has output lines FS on which function signals corresponding to the command word just processed are delivered and which can be drawn upon for the control of, for example, a peripheral device. Further, the memory SP has output lines AL1 and AL2, upon which addresses are delivered. Finally, the memory has output lines L3-L6 which serve to provide control signals for other components of the control unit.

The individual command words in the memory SP are addressed with the help of an address unit AD1. The address unit AD1 can be constructed as a status counter. The address unit AD1 has an input T for receiving a clock pulse and an input LD for receiving a load signal. The actual address of the command which is to be executed as the next command always resides in the address unit AD1. The output of the address unit AD1 is connected to the memory SP by way of a line AL3 which, in a manner similar to other lines on the drawing, represents multiple lines.

A condition multiplexer BM is provided. Condition signals SB, a start signal STA, a stop signal STO and further signals arriving from other components of the control unit have respective inputs to the condition multiplexer BM, as indicated on the drawing. The output lines AL2 of the memory SP also have inputs to the condition multiplexer BM. By way of the lines AL2, the corresponding condition in the condition multiplexer BM is addressed by the memory SP for the interrogation of a condition upon the complete execution of a command word. If the condition is fulfilled, the condition multiplexer BM delivers the load signal LD to the address unit AD1.

A further multiplexer MX is connected at its output to the input of the address unit AD1. The output lines AL1 of the address unit AD1 are connected to inputs of the multiplexer MX. Upon occurrence of a transfer, the transfer address is delivered and supplied to the multiplexer MX by way of the lines AL1. The multiplexer MX also has further inputs at which addresses of command words of other components of the control unit or from outside can be applied.

One of the inputs of the multiplexer MX is respectively connected through to the address unit AD1 as a function of the output signal of a further address unit AD2. As a function of the further address unit AD2, therefore, addresses for command words in the memory SP, from various components of the control unit, or from outside can be loaded into the address unit AD1. Therefore, one input of the multiplexer MX can be connected with lines L2 to which an address is applied from the outside. Other inputs of the further multiplexer MX can be connected with outputs of a pair of address registers RG1 and RG2 intermediately store the actual addresses which should be processed in a program upon the occurrence of an interruption of the program. For this reason, the outputs of the address unit AD1 are respectively connected to the inputs of the address registers RG1 and RG2.

In the following, the function of the control unit will be described in greater detail. As long as no interrupt occurs in the program sequence, the control unit functions in the usual manner. The address of the command word to be processed in the memory SP then respectively resides in the address unit AD1. Upon application of a clock pulse T to the address unit AD1, this address is increased by one unit, whereby the actual address of the next command word to be processed is formed. The command words are executed in the memory SP. If the execution of a command word requires no condition interrogation, then function signals are delivered on the lines FS of the memory SP. If, on the other hand, a command word requires a condition interrogation, then the condition multiplexer BM is addressed by way of the lines AL2 and the transfer address appears on the lines AL1. With the help of the address for the condition multiplexer BM, the condition multiplexer examines whether or not the corresponding condition exists. If the condition does exist, then the condition multiplexer BM delivers a load signal which is supplied to the address unit AD1. Simultaneously, the multiplexer MX connects the lines AL1 through to the address unit AD1. Therefore, the transfer address can be loaded into the address register AD1. The next command word in the memory SP which is executed is then the command word allocated to the transfer address.

Up to this point, the control unit is distinguished from the known control units only in that the transfer address is fed to the address unit AD1 by way of the further multiplexer MX. This further multiplexer MX, however, only becomes necessary when a sequence of the program is to be interrupted. The manner in which the control unit functions in such a case will be explained below.

When an interruption of the program at any desired location is desired from the outside, then an address of the first command word which is required for the processing of the interruption resides is applied from outside on the lines L2 which are inputs to the multiplexer MX. An interrupt signal is simultaneously applied to the line L1. This latter signal is applied to an OR element OD, which has another input which is connected to the line for the load signal LD from the condition multiplexer MB. Therefore, a signal always appears at the output of the OR circuit OD when a load signal from the condition multiplexer BM or an interrupt signal occurs on the line L1. The output of the OR circuit OD is connected with the input for the load signal of the address unit AD1. The line L1 is further connected to the further address unit AD2 and to the first address register RG1. If the interrupt signal is applied to the first address register RG1, then the actual address residing in the address unit AD1 is input into the first address register RG1. The interrupt signal further influences the further address unit AD2 in such a manner that the further multiplexer MX is caused to connect the lines L2 through to the address unit AD1. Upon occurrence of the next clock pulse T, the address applied from the outside is then input into the address unit AD1. This address is supplied to the memory SP which begins with the processing of the interrupt. The address of the commannd word at which the program was interrupted is, by contrast, stored in the first address register RG1.

When the first command word following the interrupt is executed in the memory SP, a flip-flop FF is set by means of a signal on the line L5. The output line L7 of the flip-flop FF is connected to the input of the condition multiplexer BM.

When the program portion allocated to the interrupt is completed in the memory SP, then a signal is delivered at the output L4 of the memory SP to reset the flip-flop FF. This signal is also simultaneously applied to the further address unit AD2 to target the further multiplexer MX in such a manner that the first address register RG1 is connected through to the address control unit AD1. By means of the output signal of the flip-flop FF, the condition multiplexer BM is caused to deliver a load signal LD for the address unit AD1 at its output. Therefore, the content of the first address register RG1 is loaded into the address unit AD1. This, however, is precisely the address of that command word which was pending for processing upon occurrence of the interrupt. After the completion of the interrupt, therefore, the processing of the commands is continued at that location at which the interrupt occurred.

If an interrupt is desired internally in the control unit, for example because a subprogram is to be executed, then the memory SP delivers a signal at its output L3 which is supplied to the second address register RG2. This output signal causes outputing of the address stored in the address unit AD1 and feeding of the same to the second address register RG2. By contrast, the address of the first command word of the subprogram is output into the address unit AD1 by way of the lines AL1 and the multiplexer MX. The load signal LD necessary for this purpose is delivered from the condition multiplexer BM. To this end, the signal is likewise supplied to the condition multiplexer BM on the line L3.

After execution of the subprogram, a signal appears at the output L6 of the memory SP, which signal is supplied to the further address unit AD2. This signal causes the further address unit AD2 to address the furthr multiplexer MX in such a manner that the second address register RG2 is connected with the address unit AD1. The load signal required for outputing is again generated by the condition multiplexer BM. To this end, the signal is likewise offered to the multiplexer BM on the line L6. After the execution of the subprogram, therefore, the address of that command word which should be executed as the next command after the transfer of the subprogram again resides in the address unit AD1.

The exemplary embodiment of the invention illustrated on the drawing utilizes two address registers RG1 and RG2. Of course, only one address register, or more than two address registers, can be provided. The address unit AD2 is designed in such a manner that it controls the further multiplexer MX in such a manner that the lines are connected through to the address unit. If one of the other inputs of the multiplexer MX is to be connected through to the address unit AD1, then a special signal must be applied to the further address unit AD2.

Although I have described my invention by reference to particular illustrative embodiments thereof, many changes and modifications of the invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. In a control unit of the type having a memory in which programs comprising control words are stored in correspondence with which either function signals are delivered or, depending on the presence of a predetermined condition, a transfer is executed to another command word stored in the memory, having a condition multiplexer which is connected to and addressed by the memory, the condition multiplexer having inputs for receiving condition signals and selectively operable to deliver a load signal, and having an address unit connected to the input of the memory and to the condition multiplexer for storing the actual address of a command word to be targeted in the memory and responsive to a load signal to cause the memory to output the transfer address of the next command word, the improvement therein for executing interruptions in the program sequence at any given moment comprising:
- a further multiplexer including an input connected to an output of the memory for receiving transfer addresses, and an output connected to an input of the address unit;
- a further address unit including an output connected to an input of said further multiplexer for delivering addresses for connecting the various other inputs of the further multiplexer through to the address unit; and
- at least one address register including a first input connected to the output of the address unit for receiving and storing addresses, a second input for receiving an interrupt signal to cause such storage, and
- an output connected to an input of the further multiplexer to feed the stored address to the further multiplexer after completion of the interrupt process.

2. The improved control unit of claim 1, wherein said second input of said address register is adapted to receive an externally generated interrupt signal.

3. The improved control unit of claim 2, wherein: said address unit and said further address unit each include an input connected to receive the interrupt signal; and
- said further multiplexer includes an input for receiving the address of the next command word to be processed in the interrupt mode.

4. The improved control unit of claim 1, further comprising
- a second register including a first input connected to the output of the address unit, an output connected to an input of said further multiplexer, and a second input connected to an output of the memory for receiving an internal interrupt signal.

5. The improved control unit of claim 1, further comprising:
- a flip-flop including a set input and a reset input connected to respective outputs of said memory, said flip-flop respectively set and reset upon initiation and upon termination of an interrupt when the content of said register is fed to the address unit via said further multiplexer, and an output connected to an input of the condition multiplexer.

6. The improved control unit of claim 1, wherein: said further address unit includes inputs connected to certain outputs of the memory for receiving signals to cause retransmission of the content of said register into the address unit via said further multiplexer.

* * * * *